United States Statutory Invention Registration [19]

[11] Reg. Number: H844

Otto et al. [43] Published: Nov. 6, 1990

[54] ENERGY CONVERSION USING SPATIALLY MULTIPLEXED OPTICAL INPUTS

[75] Inventors: William F. Otto; Debbee J. Jordan; Joseph H. Parker, all of Huntsville, Ala.

[73] Assignee: The United States of America as represented by the Secretary of the Army, Washington, D.C.

[21] Appl. No.: 517,007

[22] Filed: Apr. 30, 1990

[51] Int. Cl.[5] ..... G02B 27/10; G02F 1/00

[52] U.S. Cl. ..... 363/178; 350/96.1; 350/169; 455/609

*Primary Examiner*—Thomas H. Tarcza
*Assistant Examiner*—Linda J. Wallace
*Attorney, Agent, or Firm*—James T. Deaton; Freddie M. Bush

[57] ABSTRACT

Optical energy is conveyed through a region and is subsequently converted into electrical energy when it reaches the area of its intended use. Spatially multiplexed laser light is transmitted through an optical fiber to convey the energy through the area. Several light beams or several light beam paths may be used to convey a plurality of beams of light energy into an area either simultaneously or sequentially. Typically, two light beams enter the fiber at different angles of incidence, resulting in a first annulus of laser light that impinges on a first photocell and a second annulus of laser light that impinges on second photocell. This sequence continues alternately with the electrical outputs of the two photocells being coupled to a step-up transformer to provide electrical power for a system of interest, and or the energy being directed to a communication circuit for removing intelligence signals therefrom.

7 Claims, 2 Drawing Sheets

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

ENERGY CONVERSION USING SPATIALLY MULTIPLEXED OPTICAL INPUTS

DEDICATORY CLAUSE

The invention described herein may be manufactured, used, and licensed by or for the Government for governmental purposes without the payment to us of any royalties thereon.

BACKGROUND OF THE INVENTION

In electrical systems the operation or testing of many electronic system components in a desired region of operability can be adversely affected by an undesirable unbalancing of the prevailing electromagnetic field of a region when electrical power cables are introduced into the area. To assure or enhance operation of these sensitive systems, low power can be delivered optically from a laser source across a sensitive region and into a system of interest or a controlled environment and subsequently using photovoltaic cells to convert this energy into electrical energy. However, photovoltaic cells produce very low voltage, approximately 0.5 to 1.0 volts per cell. Often a system's power requirements may be 30 times that voltage, and even more. To provide the required voltage under the environmental conditions noted requires a large, bulky arrangement of the cells. Other problems are created by the necessary series connection between such cells and the fact that the current produced by the series connection of the cells is limited to that of the cell producing the least amount of current. Thus, a system is needed that will not adversely affect the natural or established electromagnetic fields where the system is located and which can provide both intelligence signal and power without the inherent current limitations of prior art series connected cells.

SUMMARY OF THE INVENTION

A system and method of energy conversion is provided wherein spatially multiplexed optical energy is coupled through a region and then converted to electrical energy. A first laser light beam is directed through an optical fiber, exiting the fiber as a ring or annulus of laser light and is collected by a photovoltaic cell. One or more additional laser light beams are directed through the optical fiber at different angles of incidence of the impinging light entering the fiber. Upon exiting the fiber each beam is in the form of a ring or annulus of light leaving the fiber at a solid angle of rotation equal to the planar angle of incidence. Due to the angular separation of each annulus of light exiting the fiber the beams are collected by different photovoltaic cells. The electrical voltage output from the cells may then be transformed into useful electrical power and/or communication signals by, for example, coupling the energy to a step-up transformer for providing the required voltage for a systems operation and/or by coupling the energy to a signal processing circuit to filter and detect intelligence signals modulated into the energy.

DESCRIPTION OF THE PREFERRED EMBODIMENT

Figure 1:
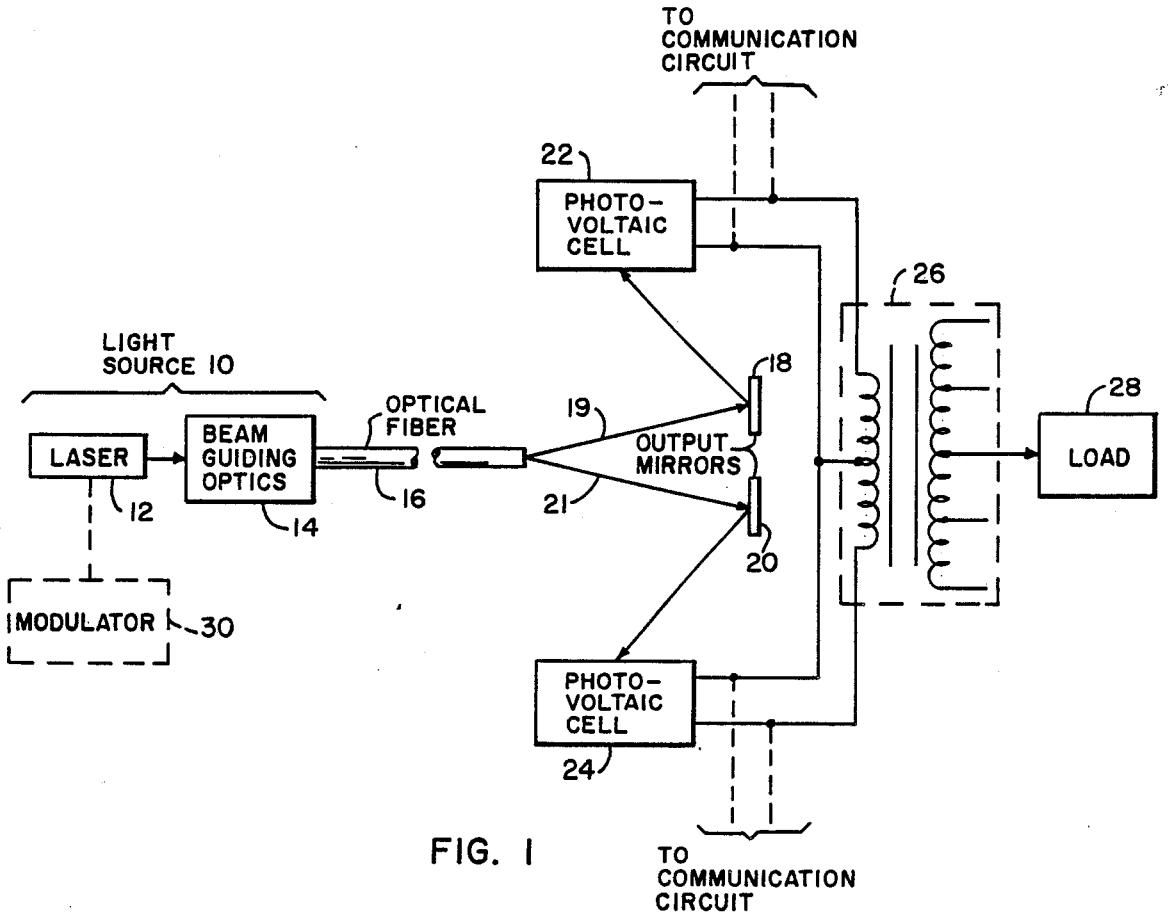
FIG. 1 is a simplified, diagrammatic view of the energy conversion system coupled between a laser and load circuit.

Referring now to the drawings wherein like numbers refer to like parts, FIG. 1 discloses a diagrammatic view of a preferred embodiment of the energy conversion system. A light source 10 for the system is comprised of a laser 12 and beam guiding optics 14 for directing a laser beam of light down more than one optical signal paths into a single, multimode optical fiber 16. By allowing the laser light to enter the fiber either alternately or sequentially at different angles of incidence and repeating the sequence, two or more beams of light are transmitted through the single fiber without interference between the beams of light. These light rays each exit fiber 16 as a ring or annulus of light and are directed to output mirrors 18 and 20 as separate rings of light 19 and 21. The vertex of each annulus or ring of light substantially defines a cone as it moves from its vertex at the output end of fiber 16 to impinge on mirror 18 or 20. The rings of light are reflected to respective photovoltaic cells 22 and 24. Photovoltaic cells 22 and 24 convert the optical input into output electrical energy as pulses of voltage which are directed to opposite sides of a step-up transformer 26 to provide an alternating current output according to well established procedures in the art and not discussed herein. The voltage may then be coupled directly to the system load 28 or be processed as by filtering (not shown) to provide smoother alternating or direct current outputs to the load according to standard practice. For communication purposes, typically, as shown in dashed lines, a modulator circuit 30 (such as a chopper wheel) may be coupled to laser 12 to modulate the output beam with intelligence signals. These signals can subsequently be picked off and the intelligence detected by communication signal processing circuits as is well known in the art. As shown also in dashed lines, this communication signal may be taken after the photovoltaic cell conversion. Alternatively, the communication signal may be taken by beam splitting optics in either one or both beams 19 and 21 before they reach the respective photocells and subsequently processed to remove the intelligence signals.

Figure 2:
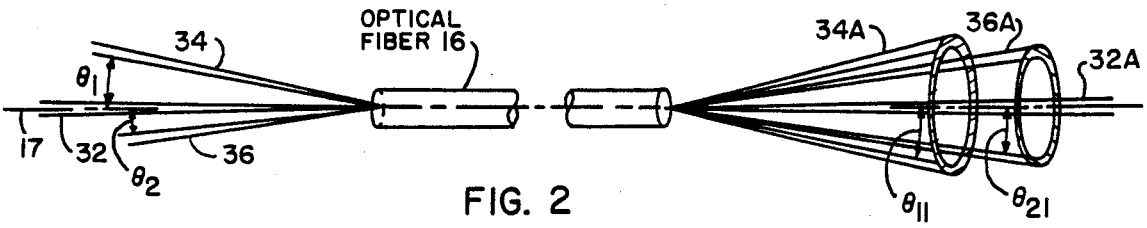
FIG. 2 discloses the method of spatial light transmission within a single, multimode optical fiber.

As shown more particularly in FIG. 2, laser light rays entering fiber 16 at an angle within the fiber's acceptance angle, will exit the fiber as a conical beam centered at the same angle to the fiber's axis, producing rings of light around the axis. The acceptance angle is the angle over which a fiber accepts light, depends on the refractive indexes of core and cladding of the fiber. Fiber 16 has a longitudinal central axis 17 which is central to the fiber at any cross sectional area regardless of curvature of the fiber. Thus a light beam 32 entering fiber 16 on axis is entering at zero degrees and exits the fiber as an axial beam 32A. A light beam 34 entering fiber 16 at an angle $\theta_1$, with axis 17 exits the fiber as an annular ring of light 34A circumscribing an angle $\theta_{11}$, around axis 17. Similarly, a light beam 36 entering the fiber at an angle $\theta_2$ exits as an annular ring of light 36A circumscribing an angle $\theta_{21}$ around the axis. For the particular embodiments shown, wherein two beams 34 and 36 are employed, $\theta_1$ and $\theta_{11}$ are equal to 12 degrees, while $\theta_2$ and $\theta_{21}$ are equal to 8 degrees. These angles are not limiting, however, except that for a particular beam, the exit angle circumscribed by the annular ring output is a solid angle equal to the entrance (planar) angle of the associated input beam.

Figure 3:
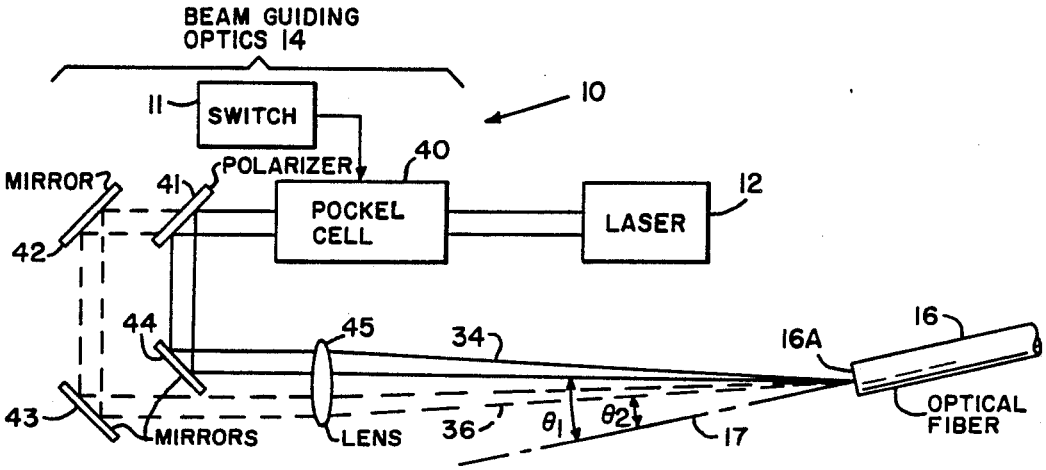
FIG. 3 is a schematic showing the beam guiding optics of FIG. 1 in more detail.

The beam guiding optics 14 that determines the angle of incidence ($\theta_x$) of respective beams 34 and 36 is shown in FIG. 3. The output light from laser 12 enters a pockel cell 40 or other medium for switching the direction of the beam. The pockel cell is cyclically switched by alternately applying an electric field to the medium and then removing the field. Before operation the beam is adjusted so that with pockel cell 40 turned on (activated by application of the field) the beam enters fiber 16 at angle $\theta_1$ with respect to axis 17 at the point of entry. When the pockel cell is turned off (deactivated) the beam is at the angle $\theta_2$. Mirrors, 42, 43, 44 are used merely to fold the path of optics 14 into a smaller physical space and are otherwise not required. Mirror 41 is polarization sensitive and its use is essential to the switching process. As shown the respective beams 34 and 36 are coupled alternately from pockel cell 40 to lens 45 and focused at the end 16A of fiber 16 at their respective angle of entry $\theta_1$ and $\theta_2$. Pockel cell 40 alternates polarization of the output signal therefrom, polarizer 41 responds to the alternating output to switch the beam between mirrors 42 and 44.

Figure 5:
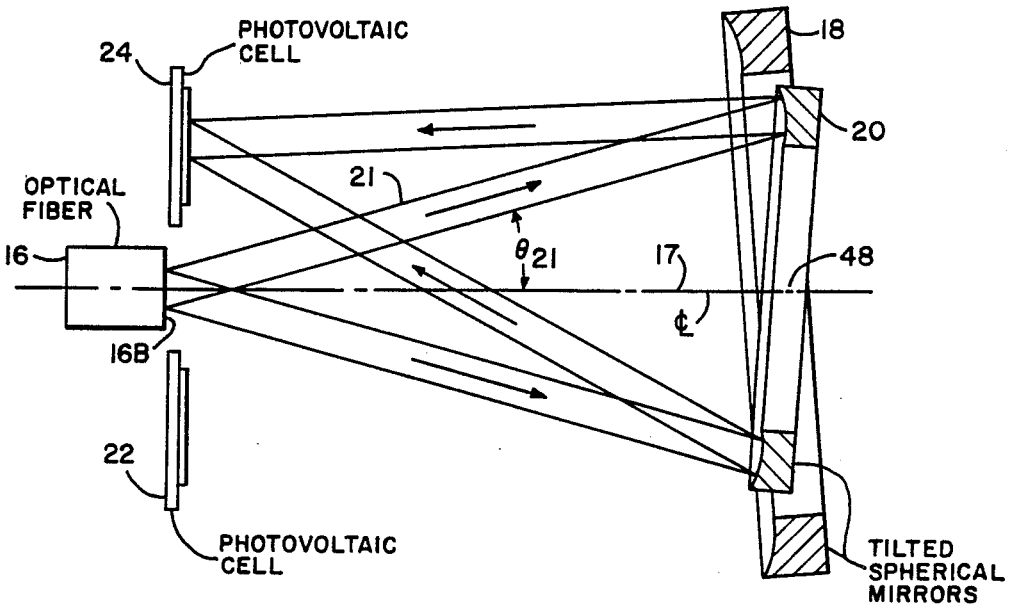
FIGS. 4 and 5 are schematics showing the optical beam paths controlled by the output mirrors and the optical to electrical energy conversion circuit.
Figure 4:
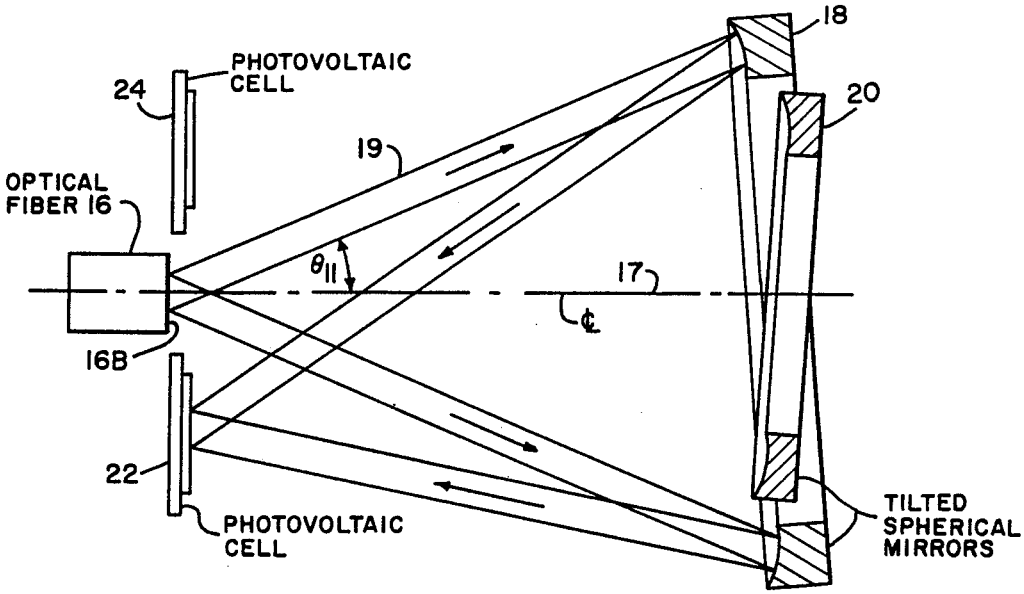

FIGS. 4 and 5 disclose the optical arrangement of the output mirrors 18 and 20 and the photovoltaic cell to receive beams 19 and 21 respectively and direct them to the respective photocells 22 and 24. Mirrors 18 and 20 are spherical mirrors having a common center line that coincides with axis 17 as it lies with respect to end 16B of optical fiber 16. The center point 48 of the two mirrors lies in an axis of tilt or rotation for the mirrors, allowing mirror 20 to be tilted forward to direct the impinging ring of light onto photocell 24 and allowing mirror 18 to be tilted to focus and direct the beam 19 onto photocell 22.

In operations of the system, with pockel cell 40 "off", the beam follows beam path 36 impinging fiber 16 at angle $\theta_2$, passes through the fiber, exits as a ring (beam 21) at angle 1 $\theta_{21}$, reflects from mirror 20 and impinges on photovoltaic cell 24 wherein it is converted to electrical energy and, as shown in solid lines is coupled to a transformer for providing power, and as shown in dashed lines can be sampled for intelligence signals riding on the voltage.

When the pockel cell is stressed "on" the beam then follows path 34, impinging the fiber end at angle $\theta_1$, passes through the fiber and is reflected as a ring of light 19 from mirror 18 to photocell 22 and is processed in like manner as beam 21. Transformer 26 prepares the energy for use by the load.

The drawings disclose primarily the conveyance and processing of two optical annular rings of light for generation of power. Obviously more light beams can be processed, spaced apart angularly without exceeding the angle of acceptance of the fiber input end. More than one laser can be used, operating simultaneously or alternately, thereby providing more than one power source within a single system or providing sources to separate and distinct systems. Additionally the laser light can be modulated to provide both communication signals and power system requirements for a system or used solely for communication signals.

Other uses will readily suggest themselves to those practicing this form of energy conversion. Accordingly the scope of the invention is limited only by the claims appended hereto.

We claim:

1. An energy conversion system, comprising: a light source for providing a laser light beam output and for directing said light beam sequentially along different optical paths, a single multimode optical fiber coupled to said light source for receiving and conveying said light beam along said different optical paths to exit at a single output end of said fiber, a plurality of light energy conversion means disposed adjacent to said output end of said optical fiber for receiving said light beam and converting optical energy into electrical energy.

2. An energy conversion system, as set forth in claim 1 wherein said light energy conversion means are first and second photocells disposed for receiving light alternately thereon and further comprising a step-up transformer for receiving outputs from said photocells and transforming them into alternating current energy.

3. An energy conversion system as set forth in claim 2 wherein said light source comprises a laser for generating a beam of light and optical beam guidance means for directing said light beam along said different optical paths, said optical paths being first and second paths, said optical fiber having and input end, said optical paths intersecting said input end of said optical fiber at respective first and second angles of incidence to the central, longitudinal axis of the fiber at the input end.

4. An energy conversion system as set forth in claim 3 wherein said optical beam guidance means comprises a pockel cell and lens, said pockel cell being disposed for receiving said beam of light from said laser and being switchably responsive to alternate the beam of light's direction along said first and second optical paths through said lens, said lens focusing said beams on said fiber input end.

5. An energy conversion system as set forth in claim 2 and further comprising first and second spherical mirrors having a common central axis, said mirrors being tilted with respect to said central axis, said central axis being coincident with the longitudinal axis of said optical fiber at the output end of said fiber, said first mirror being tilted with respect to said axis for receiving optical energy from said fiber output end and directing said energy toward said first photocell, said second mirror being tilted with respected to said axis for receiving optical energy from said fiber output end and directing said energy toward said second photocell.

6. An energy conversion system as set forth in claim 5 wherein said light source comprises a laser for generating a beam of light and optical beam guidance means for directing said light beam along said different optical paths, said optical paths being first and second paths, said optical fiber having an input end, said optical paths intersecting said input end of said optical fiber at respective first and second angles of incidence to the longitudinal axis of the fiber at the input end.

7. A method for converting light energy into electrical energy, comprising the steps of:

directing a beam of laser light alternately along first and second optical paths as respective first and second beam portions of light;

guiding said beam portions of light along said paths into an optical fiber for transmission of said beam portions to a remote location;

focusing each of said beam portions at respective different angles of entry into said fiber with respect to the longitudinal axis of said fiber;

redirecting each of said beam portions of light to respective first and second optical energy detectors upon exit of the beam portion from said fiber; and converting said light energy beam portion into electrical energy pulses for power consumption.

* * * * *